United States Patent [19]

Plisson et al.

[11] Patent Number: 5,747,703
[45] Date of Patent: May 5, 1998

[54] METHOD AND APPARATUS FOR MONITORING VARIATION IN THE CURRENT VALUE OF A RATE OF FLUID FLOW THROUGH A FLOW METER

[75] Inventors: François Plisson, Buc; Philippe Janet, Eragny-sur Oise; Frédéric Puybaret, Colombes, all of France

[73] Assignee: Schlumberger Industries S.A., Montrouge, France

[21] Appl. No.: 656,182
[22] PCT Filed: Nov. 30, 1994
[86] PCT No.: PCT/FR94/01396
§ 371 Date: Oct. 7, 1996
§ 102(e) Date: Oct. 7, 1996
[87] PCT Pub. No.: WO95/16189
PCT Pub. Date: Jun. 15, 1995

[30] Foreign Application Priority Data

Dec. 7, 1993 [FR] France ................... 93 14664

[51] Int. Cl.⁶ ................................. G01F 15/00
[52] U.S. Cl. ................................. 73/861.77
[58] Field of Search ............... 73/861.77, 861.78

[56] References Cited

U.S. PATENT DOCUMENTS

| | | | |
|---|---|---|---|
| 3,130,582 | 4/1964 | Phillips et al. | 73/861.77 |
| 3,230,767 | 1/1966 | Heigl et al. | 73/861.77 X |
| 3,729,996 | 5/1973 | Metz | 73/861.77 |
| 3,772,916 | 11/1973 | Booth et al. | 73/861.77 |
| 3,821,896 | 7/1974 | Grob | 73/861.77 |
| 3,873,814 | 3/1975 | Mirdadian | 73/861.77 X |
| 4,345,480 | 8/1982 | Basham et al. | 73/861.77 |
| 4,432,244 | 2/1984 | Kataoka et al. | 73/861.77 |
| 4,441,505 | 4/1984 | Edwards et al. | 73/861.77 X |
| 4,467,660 | 8/1984 | McMillan, Jr. | 73/861.77 X |
| 4,565,090 | 1/1986 | Gotanda | 73/861.77 X |
| 4,866,633 | 9/1989 | Nakane et al. | |
| 4,872,352 | 10/1989 | Alden et al. | 73/861.77 |
| 4,928,728 | 5/1990 | Nakane et al. | |
| 4,987,877 | 1/1991 | Nakaniwa | 73/118.2 X |
| 5,184,519 | 2/1993 | Ciarelli et al. | 73/861.77 |
| 5,251,149 | 10/1993 | Williams et al. | 73/861.77 X |
| 5,252,824 | 10/1993 | Picanyol | 73/861.77 X |
| 5,388,466 | 2/1995 | Teunissen | 73/861.77 X |
| 5,450,760 | 9/1995 | Lew et al. | 73/861.77 |

FOREIGN PATENT DOCUMENTS

| | | | |
|---|---|---|---|
| 0000519 | 1/1982 | Japan | 73/861.77 |
| WO 94/21990 | 9/1994 | WIPO | 73/861.77 |

Primary Examiner—Geroge M. Dombroske
Assistant Examiner—Paul D. Amrozowicz
Attorney, Agent, or Firm—Leonard W. Pojunas

[57] ABSTRACT

The invention provides a method of monitoring variation in the current value of a rate of fluid flow through a fluid meter which includes a measurement unit and a rotary shaft connected to said measurement unit and suitable for rotating about its own axis when a volume of fluid passes through the measurement unit, the method consisting in detecting rotary movements rather than rotation of the shaft at a sampling frequency that is variable in application of a predetermined sampling relationship, said frequency being defined as a function of at least one predetermined fluid flow rate value, and in electronically processing bits corresponding to detection and to non-detection of a rotary movement of the shaft at said sampling frequency in order to determine the current value of the fluid flow rate over a continuum of flow rates and relative to the predetermined fluid flow rate value included in said continuum of flow rates.

32 Claims, 7 Drawing Sheets

METHOD AND APPARATUS FOR MONITORING VARIATION IN THE CURRENT VALUE OF A RATE OF FLUID FLOW THROUGH A FLOW METER The present invention relates to a method of monitoring variation in the current value of a rate of fluid flow through a flow meter, and also to a flow meter including apparatus for implementing such method.

BACKGROUND OF THE INVENTION

Two main types of flow meter are known (namely turbine meters and positive-displacement meters having membranes) that share a common characteristic of including a measurement unit or "measuring block" through which a volume of fluid flows and to which a shaft is connected that is driven in rotation about its own axis under the effect of the fluid flowing through said measurement unit.

The shaft may be directly connected to the measurement unit, as in a turbine meter, or it may be indirectly connected to said measurement unit, as in a positive displacement meter having membranes.

Each revolution of the rotary shaft represents a given fluid volume which is a function of the meter.

Thus, to determine the current value of the rate of fluid flow through the meter, it suffices to detect accurately the rotary motion of the shaft over time.

Unfortunately, it is very difficult to detect said rotary motion accurately, e.g. because of friction between the various moving elements in the meter and the measurement mechanism of said meter which gives rise to irregularities in the rotary motion and thus to discontinuities in the variation of the speed of rotation of the shaft.

In addition, the shaft may be subject to small amounts of oscillation.

All of these phenomena give rise to inadequate knowledge of the exact instants at which the position of the shaft is sampled, thereby making it very difficult to perform subsequent electronic processing to determine a fluid flow rate.

Also, when a meter of that type is fitted with its own power supply, e.g. a battery, it is appropriate to reduce the power consumption of said meter to as small a value as possible in order to increase the lifetime of the power supply.

However, not only are fluid meters required to determine accurately and at low power cost the current value of the fluid flow rate, but they are also required to monitor variations over time in said value, over a continuum of flow rates and relative to certain predetermined fluid flow rate values lying in the continuum.

For example, when the fluid flow rate reaches the predetermined maximum value of the flow rate measuring range of the meter, it is necessary for safety reasons to respond quickly by closing a valve situated upstream from the fluid meter.

To do this, the current value of the fluid flow rate must be known accurately over the entire range up to the predetermined maximum value.

For example, for a domestic gas meter, accuracy of the order of 2% to 5% is required for determining the maximum value.

Also, while the fluid meter is in operation, the flow rate can vary suddenly and take on a value greater than the predetermined maximum value, i.e. it can take up an "excess rate".

It is then essential firstly to perceive this increase in the current flow rate value quickly and secondly to be able to take immediate action on the valve.

For example, for a domestic gas meter having a maximum flow rate value of 6 $m^3/h$, the excess rate can reach values of the order of 50 $m^3/h$ in 100 ms, giving about 15 seconds in which to close the valve.

It can thus be seen that it is very important to monitor variation in the rate of flow of a fluid relative to said maximum flow rate value and said excess flow rate value, and that it is also essential to be able to follow this variation over the entire continuum of flow rates, i.e. to avoid missing any detections of shaft position representative of an increase in the speed of rotation of the shaft and thus of the flow rate.

The use of magnetic sensors for detecting the rotary motion of a shaft is known. In such a configuration, a magnetic sensor is secured to the rotary shaft, another magnetic sensor is secured to a stationary support, and on each revolution of the shaft, when the two sensors face each other, the stationary sensor delivers a pulse that corresponds to a given volume of fluid. However, to withstand the action of external magnetic fields, such fluid meters that include magnetic sensors must be fitted with special protection, e.g. magnetic screening.

It is also known to make use of resonant detection systems to detect the rotary motion of the shaft, but such systems are unsuitable for satisfying the problem posed.

OBJECTS AND SUMMARY OF THE INVENTION

The present invention seeks to remedy the drawbacks of the prior art by proposing a method of monitoring variation in the current value of a rate of fluid flow through a flow meter, and also by proposing a flow meter that includes apparatus for implementing said method, and serving in particular to detect a maximum flow rate and an excess flow rate over a continuum of flow rates, and to do so while consuming as little power as possible.

The present invention thus provides a method of monitoring variation in the current value of a rate of fluid flow through a fluid meter which includes a measurement unit and a rotary shaft connected to said measurement unit and suitable for rotating about its own axis when a volume of fluid passes through the measurement unit, the method consisting in detecting rotary movements rather than rotation of the shaft at a sampling frequency that is variable in application of a predetermined sampling relationship, said frequency being defined as a function of at least one predetermined fluid flow rate value, and in electronically processing bits corresponding to detection and to non-detection of a rotary movement of the shaft at said sampling frequency in order to determine the current value of the fluid flow rate over a continuum of flow rates and relative to the predetermined fluid flow rate value included in said continuum of flow rates.

According to another characteristic of the invention:
rotary movements rather than rotation of the shaft are detected at at least two sampling frequency values $f_1$ and $f_2$ predetermined by the sampling relationship in such a manner that $f_1$ is defined as a function of a first predetermined fluid flow rate value $Q_1$, and $f_2$ is defined as a function of $Q_1$ and of a second predetermined fluid flow rate value $Q_2$, where $f_1 < f_2$ and $Q_1 < Q_2$, with the frequencies $f_1$ and $f_2$ thus defining two ranges of flow rates of the continuum, which ranges overlap partially, one extending up to a flow rate value $Q'_1$ defined by the frequency $f_1$, where $Q_1<Q'_1<Q_2$, and the other extending from a flow rate value $Q'_2$ defined by said frequency $f_1$ and up to a value $Q_2$, where $Q_1<Q'_2<Q'_1$, and the bits are processed electronically as a function of said frequencies $f_1$ and $f_2$ in order to determine the current value of the fluid flow rate relative to said ranges of flow rates.

Advantageously, the method of the invention makes it possible to determine which range of flow rates contains the current value of the fluid flow rate. The characteristic whereby the flow rate ranges overlap in part and which is due to a particular choice of sampling relationship thus makes it possible to track very closely all rotary motion of the shaft over a wide range of speeds of rotation, i.e. to monitor variation in the current value of the rate of flow over the entire continuum of flow rates.

According to other characteristics of the invention:

prior to processing the bits electronically, said method consists in performing the following steps:
1) a plurality of consecutive electrical signals are generated at the sampling frequency which is variable in application of the predetermined sampling relationship;
2) at least one sensor is powered with each of said electrical signals, said sensor being placed facing the path of at least one mark associated with the rotary shaft and being designed to deliver a binary output state depending on the position of said sensor relative to said mark; and
3) said binary output states are used to form an output signal representative of the succession in time of bits corresponding to detection and to non-detection of a rotary movement of the shaft, each detection representing a given volume of fluid; and during step 1):
a) during a first time interval $\Delta t_1$, at least one electrical signal is generated at the frequency $f_1$;
b) during a second time interval $\Delta t_2$ consecutive to $\Delta t_1$, at least one electrical signal is generated at the frequency $f_2$; and
c) the above steps are repeated.

During the method of the invention:
a) the bits representing detection and non-detection of rotary movement of the shaft coming from the output signal are continuously processed electronically at the sampling frequency $f_1$;
b) at the end of a time interval $\Delta t_1$ during which the bits are electronically processed at said frequency $f_1$, the bits representing detection and non-detection of rotary movement of the shaft coming from said output signal are simultaneously processed electronically at the sampling frequency $f_2$; and
c) the above two steps are repeated;

the frequency $f_2$ depends on the frequency $f_1$;

the frequency $f_2$ is greater than or equal $\lfloor Q_2/2Q'_2 \rfloor f_1$ where $\lfloor x \rfloor$ represents the first integer greater than or equal to x; and the sampling frequency $f_1$ is greater than twice the value of the rotary frequency of the shaft which is obtained when the current value of the fluid flow rate is equal to $Q_1$.

According to other characteristics of the invention:

a plurality of marks are associated with the rotary shaft;

instead of generating a plurality of consecutive signals at respective frequencies $f_1$ and $f_2$, a plurality of consecutive signals are continuously generated at a sampling frequency $f_3$ greater than the frequency $f_2$ and selected as a function of a predetermined fluid flow rate value $Q_3$, where $Q_3<Q_1$, as a function of $f_2$, and as a function of the number of marks, and the number of detections of rotary movement of the shaft is counted in order to determine the current fluid flow rate value relative to the predetermined values $Q_1$ and $Q_3$;

simultaneously the bits of the output signal are continuously electronically processed at the sampling frequencies $f_1$ and $f_2$ to determine the current value of the fluid flow rate relative to the predetermined values $Q_1$ and $Q_2$, and more particularly relative to the two flow rate ranges;

the frequency $f_3$ is greater than the product of the number of marks multiplied by the frequency $f_2$;

during electronic processing of the bits at the sampling frequency $f_1$, a number $I_1$ of bits are selected by being stored at the sampling frequency $f_1$ over a time interval $I_1/f_1$, the $I_1$ bits are summed as they are stored in order to determine the current fluid flow rate value up to the predetermined value $Q'_2$ with accuracy that depends on $I_1$ and $f_1$;

prior to summing the $I_1$ bits, each of them is given a weighting coefficient so as to improve accuracy in determining the current fluid flow rate value;

the $I_1$ bits are stored in a shift register having $I_1$ bit positions, and an identical and maximum weighting coefficient is given to each of the central bit positions while respectively increasing and decreasing coefficients are given to the bit positions corresponding to the last and first bits stored;

during electronic processing of the bits at the sampling frequency $f_2$, a predefined number $I_2$ of output signal bits are selected and the number of bits in said $I_2$ bits and representing detections of shaft movement is identified, and if the identified number is not less than a predetermined number $I_3$, then the current fluid flow rate value lies between the predetermined fluid flow rate values $Q'_2$ and $Q_2$, otherwise said current value is less than $Q'_2$;

the predefined number $I_2$ of bits depends on $f_2$, $Q_1$, and on the number of marks;

the number $I_3$ depends on $Q_1$, and on the number of marks;

prior to reconstituting the signal, it is determined whether the movement of the shaft is a rotary movement or an oscillatory movement by powering another sensor in alternation and by identifying and selecting the successive binary output states of the sensors; and the sensor is an optical sensor.

The present invention also provides a fluid meter comprising a measurement unit for measuring a volume of fluid, which unit is connected to a rotary shaft for which each revolution represents a volume of fluid passing through said measurement unit, and apparatus for monitoring variation in the current value of the fluid flow rate on the basis of rotation of said shaft to implement the method. The said apparatus comprises:

at least one sensor placed facing the path of at least one mark associated with the rotary shaft and designed to deliver an output bit depending on the position of said sensor relative to said mark;

means for generating consecutive electrical signals at a sampling frequency that is variable in application of a predetermined sampling relationship to power said optical sensor, each frequency value being defined as a function of at least one predetermined fluid flow rate value;

means for forming an output signal on the basis of the binary output states delivered by the sensor, said output signal representing the succession in time of bits corresponding to detection and non-detection of a rotary movement of the shaft; and electronic bit processing means for processing said bits depending on said sampling frequency in order to determine the current value of the fluid flow rate over a continuum of flow rates and relative to the predetermined fluid flow rate value on which the value of the sampling frequency depends.

According to other characteristics of the invention:

the electronic bit processing means, comprise, in particular, means for selecting a predefined number of bits of the output signal which number is different for each value taken by the sampling frequency;

the electronic bit processing means comprise means for selecting a predefined number $I_1$ of output signal bits at a value $f_1$ of the sampling frequency selected as a function of a predetermined fluid flow rate value $Q_1$, said means being storage means, together with summing means for summing the stored $I_1$ bits to determine the current value of the fluid flow rate over a range of flow rates of the continuum extending up to a value greater than $Q_1$ and defined by the value selected for $f_1$, with said determination having accuracy that depends on $I_1$ and $f_1$;

the bit storage means comprise at least one shift register constituted by $I_1$ bit positions each designed to receive one bit at the sampling frequency $f_1$;

the electronic processing means also comprise weighting means for weighting the $I_1$ bits in application of a relationship that applies an identical and maximum weighting coefficient to each of the central bit positions and respectively increasing and decreasing weighting coefficients for the bit positions corresponding to the last and first stored bits, said weighting relationship serving to improve the accuracy with which the current flow rate value is determined;

the electronic bit processing means comprise means for selecting a predefined number $I_2$ of bits of the output signal at a value $f_2$ for the sampling frequency, $f_2$ depending on $f_1$, on $Q_1$, and on a second predetermined fluid flow rate value $Q_2$, where $f_1<f_2$ and $Q_1<Q_2$, $I_2$ depending on $f_2$, on $Q_1$, and on the number of marks, and also means for identifying amongst said $I_2$ bits the number of bits representing detection of shaft movement, said number serving to determine whether the current fluid flow rate value lies in the range of flow rates going up to the value greater than $Q_1$, or in a range that extends from said value up to $Q_2$; and the sensor is an optical sensor and the marks are visible marks.

According to yet more characteristics of the invention:

the apparatus for monitoring variation in the current value of a fluid flow rate includes a wheel constrained to rotate with rotation of the shaft and provided with a number of teeth or visible marks equal to D1;

the apparatus for monitoring variation in the current value of the fluid flow rate includes another wheel constrained to rotate with the shaft and provided with a number of teeth or visible marks equal to D2, where D2>D1;

the apparatus for monitoring variation in the current value of the fluid flow rate include means for determining whether the movement of the shaft is a rotary movement or an oscillatory movement;

the means for determining whether the movement of the shaft is a rotary movement or an oscillatory movement comprise a second optical sensor for each wheel and disposed relative to the first optical sensor at an angle equal to half the width to one of the teeth, together with electronic processing means for identifying and selecting the successive output states of the optical sensors; and each optical sensor is constituted by an emitter and a receiver placed facing each other on either side of the path of teeth of the wheel.

BRIEF DESCRIPTION OF THE DRAWINGS

Other characteristics and advantages of the invention appear from the following description given purely by way of non-limiting example and made with reference to the accompanying drawings, in which.

MORE DETAILED DESCRIPTION

Figure 1:
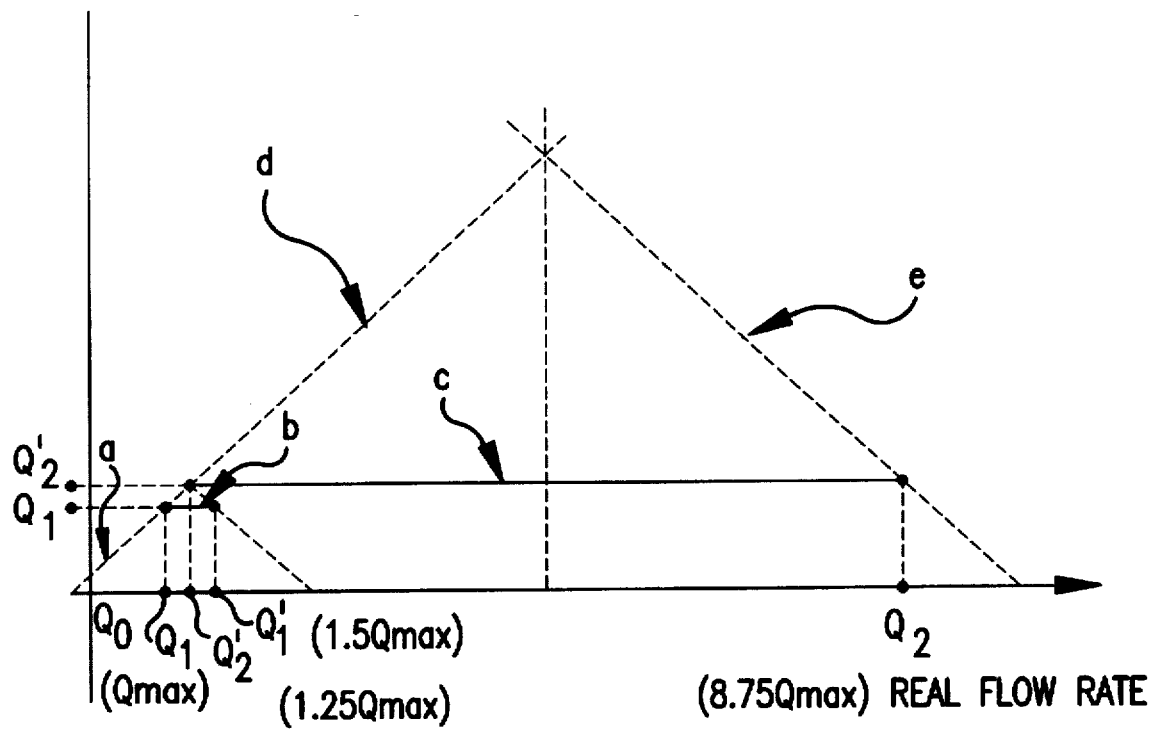
FIG. 1 is a diagram showing variation in the current value of the flow rate of gas that is sampled as a function of the real flow rate of the gas.

The invention applies most particularly to a domestic gas meter of the kind having membranes as is widely known and therefore not described in the following description. Such a domestic meter that is not shown in the figures is described, for example, in European patent No. 0 128 838 and comprises a gas volume measurement unit also referred to as a measuring block, which is connected to one end of a rotary shaft 1 via a mechanical transmission system. Each revolution of the shaft represents a volume of gas that has passed through the measurement unit of the meter. The gas meter also includes apparatus 10 for monitoring variation in the current value of the rate of gas flow and comprising a sampling system, i.e. a system for detecting the position of the rotary shaft 1 at different instants over time, which system is described below.

The problem most commonly posed in gas meters of the type mentioned above and fitted with their own power supply consists in monitoring variation in the current value of the rate of flow of the fluid over a continuum of flow rates extending from a predetermined value $Q_0$, which may be equal to 0, up to a predetermined value $Q_1=Q_{max}$ included within said continuum of flow rates, with the excess rate being written $Q_2$ where $Q_0<Q_1<Q_2$.

The gas meter of the invention must be capable of situating the current value of the rate of flow of fluid relative to the predetermined values $Q_1$ and $Q_2$ in order to determine whether the meter is under excess flow rate conditions (which conditions can become established within 100 ms, for example) or whether the meter is operating under normal operating conditions within its flow rate measuring range $Q_0$ to $Q_1$ ($Q_{max}$), with this being done while consuming as little power as possible. More particularly, the invention also makes it possible to determine the current value of the gas flow rate with sufficient accuracy from $Q_0$ to $Q_1$, and even above that value.

In general terms, the method of the invention consists firstly in detecting the rotary movements rather than the rotation of the shaft at a frequency referred to as the "sampling" frequency, which frequency is variable in application of a predetermined sampling relationship, and secondly in electronically processing bits corresponding to detection or non-detection of a rotary movement of the shaft at said sampling frequency.

The sampling frequency is defined as a function of at least one predetermined gas flow rate value. In the present example, the sampling relationship is established for two sampling frequencies $f_1$ and $f_2$ for the purpose of determining the current value of the gas flow rate relative to the predetermined values $Q_1$ and $Q_2$. The frequency $f_1$ is thus defined as a function of the value $Q_1$ and the frequency $f_2$ is greater than $f_1$ and is defined as a function of $Q_1$ and of $Q_2$.

These frequencies are advantageously selected to define two ranges of flow rates that together cover the continuum of flow rates and that overlap partially so as to omit no detection of rotary movement of the shaft, and thus omit no flow rate value within said continuum.

Advantageously, a sampling frequency $f_1$ for sampling the rotary movement of the shaft is selected to be greater than twice the value taken by the frequency of rotation f of the shaft when the current value of the flow rate is equal to $Q_1$ ($Q_{max}$), thereby enabling a range of flow rates a to be defined extending from $Q_0$ to a flow rate value $Q'_2$ where $Q_1 < Q'_2 < Q_2$. By selecting this value for the frequency, it is possible to determine accurately the current value of the flow rate, and in particular to detect the flow rate value $Q_{max}$ not only from $Q_0$ to $Q_{max}$ but also from $Q_0$ up to the value $Q'_2$. For example, $f_1 = 2.5f(Q_{max})$ and $Q'_2$ thus takes the value $1.25Q_{max}$.

If a frequency $f_1$ is selected to be equal to the value $2f(Q_{max})$, it would not be possible to determine accurately the current value of the flow rate outside the range of flow rates extending from $Q_0$ to $Q_{max}$, and as a result it would not be possible to benefit from a range of flow rates around $Q_{max}$ to obtain better accuracy in determining said value.

FIG. 1 is a diagram showing variation in the current value of the gas flow rate as sampled by the above-mentioned system as a function of the real flow rate of the gas, at sampling frequency values $f_1$ and $f_2$. As can be seen in this figure, the straight line referenced by the letter a and by the equation y=x illustrates the fact that when the real flow rate of the gas increases from $Q_0$ to $Q'_2 = 1.25Q_{max}$, the sampled flow rate also increases from $Q_0$ to $Q'_2$, and can therefore be determined accurately over the range a.

Figure 2:
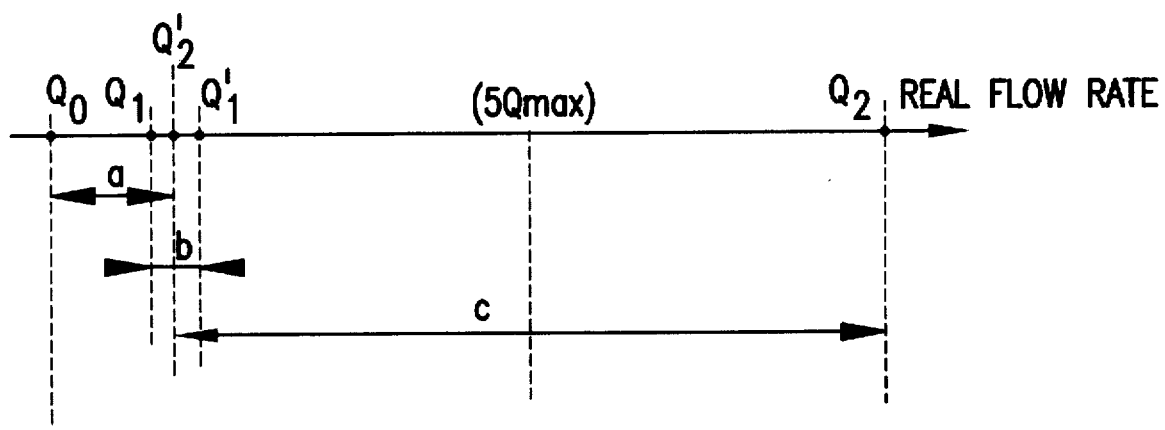
FIG. 2 is a diagram showing the various ranges of flow rates monitored by the method of the invention.

FIG. 2 shows the distribution and partial overlap of the flow rate ranges defined by the method of the invention over the continuum of flow rates ($Q_0$ to $Q_2$), and it also shows the above-defined range a. In addition, as can be seen in FIG. 1 in the portion of the diagram represented by a triangle and extending between real flow rates $Q_1$ and $Q'_1$ and sampled flow rates $Q_1$ and $Q'_2$ (=$1.25Q_{max}$), when the real flow rate increases to $Q_1$ to $Q'_1$, the sampled flow rate increases by following straight line portion y=x up to the value $Q'_2$ and then decreases following straight line portion y=−x down to the value $Q'_1$. This phenomenon known as spectrum "aliasing" or "folding" about the value $Q'_2$ makes it possible, when $Q_{max}$ is detected and the sampled flow rate is increasing and then decreasing while remaining greater than $Q_{max}$, to determine that the current value of the flow rate lies in the range b, represented by a horizontal straight line portion forming the base of the above-mentioned triangle. FIG. 2 shows clearly that the range b obtained by the spectrum aliasing phenomenon makes it possible to extend the flow rate detection range a up to $Q'_1 = 1.5Q_{max}$, thus defining a range of flow rates from $Q_0$ to $Q'_1$.

If it is desired to detect an excess rate between the two predetermined flow rates $Q_1$ and $Q_2$ as shown in FIGS. 1 and 2, then it is appropriate to select a frequency $f_2$ that depends on the frequency $f_1$ and more particularly that is greater than or equal to the expression $\lfloor Q_2/2Q'_2 \rfloor f_1$ where $\lfloor Q_2/2Q'_2 \rfloor$ represents the first integer greater than or equal to $Q_2/2Q'_2$, thereby defining a range of flow rates extending from $Q'_2 = 1.25Q_{max}$ to $5Q_{max}$ for example, for $f_2 = 4f_1$, with $Q_1 = 6$ m³/h and $Q_2 = 50$ m³/h. This frequency $f_2$ thus serves to determine exactly the current value of the flow rate when the real flow rate increases from $1.25Q_{max}$ to $5Q_{max}$, but because of the spectrum aliasing phenomenon, the method cannot determine the current flow rate value for a real flow rate increasing from $5Q_{max}$ to $Q_2 = 8.75Q_{max}$. Unfortunately, if it is desired to determine the current value of the flow rate accurately over the entire range c, it would be necessary to increase the value of the sampling frequency and thus increase in untimely manner the power consumption of the gas meter.

However, by making use of spectrum aliasing about the value $^5Q_{max}$ and detecting when the current flow rate value passes through a predetermined threshold equal to $Q'_2$, the method of the invention does make it possible, after said threshold has been detected, to determine that the current value of the flow rate lies in the range $Q'_2$ to $Q_2$ (range c) and thus that excess conditions have been reached. This characteristic is highly advantageous, given that the wide range c can be covered without any need to determine the current flow rate value accurately. In addition, the choice of frequency is judicious since the two flow rate ranges $Q_0$ to $Q'_1$ and $Q'_2$ to $Q_2$ thus overlap partially so it is not possible to miss flow rate values between the two flow rate ranges. The invention thus makes it possible to monitor variation in the current value of the rate of fluid flow over a continuum of flow rates by using an appropriate sampling relationship.

Figure 3:
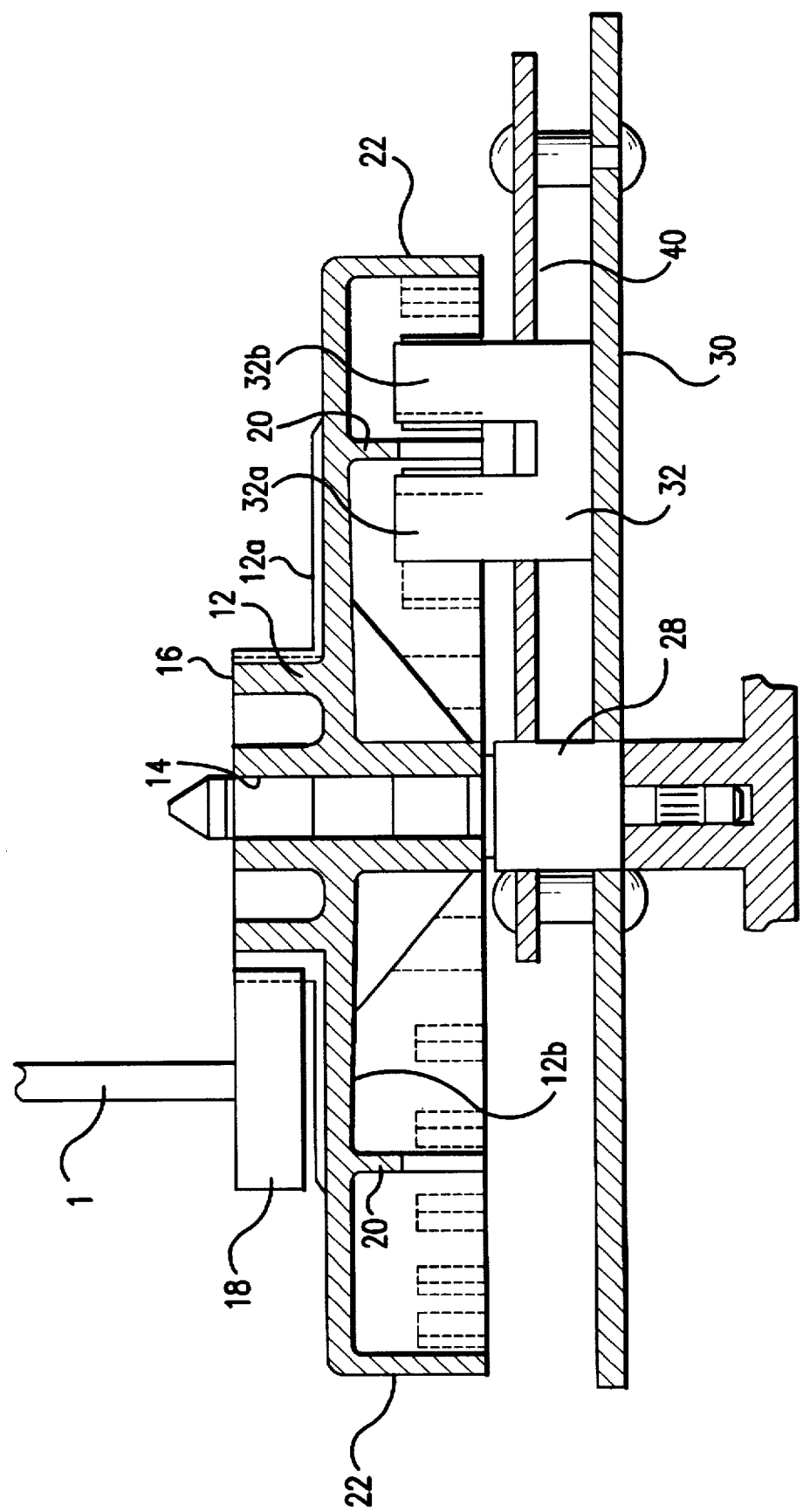
FIG. 3 is a diagrammatic plan view of toothed wheels and optical sensors of apparatus of the invention.

If sampling is performed at frequencies other than those determined by the Applicant, that can lead to two juxtaposed ranges of flow rates, in which case, given irregularities in rotary motion, it is possible that certain detections of rotary movement of the shaft will be missed, and thus that certain flow rate values will be missed at the boundary between the two ranges. That can also give rise to a high level of power consumption. As shown in FIG. 3, the apparatus 10 has a mechanical part 12 with a central hole 14 passing through said part and including on one of its large faces 12a a gear wheel 16 for meshing with another gear wheel 18 secured to the end of the shaft 1 remote from its end connected to the measurement unit of the meter. The large faces 12a and 12b of the part 12 are perpendicular to the rotary shaft 1. The part includes on its large face 12b that does not carry the gear wheel, two series D1 and D2 of visible marks or teeth that extend parallel to the axis of rotation, the marks 20 and 22 in each of said series being disposed on two circles of different radii so as to form two toothed wheels 24, 26 integrally formed with said mechanical part 12.

Figure 4:
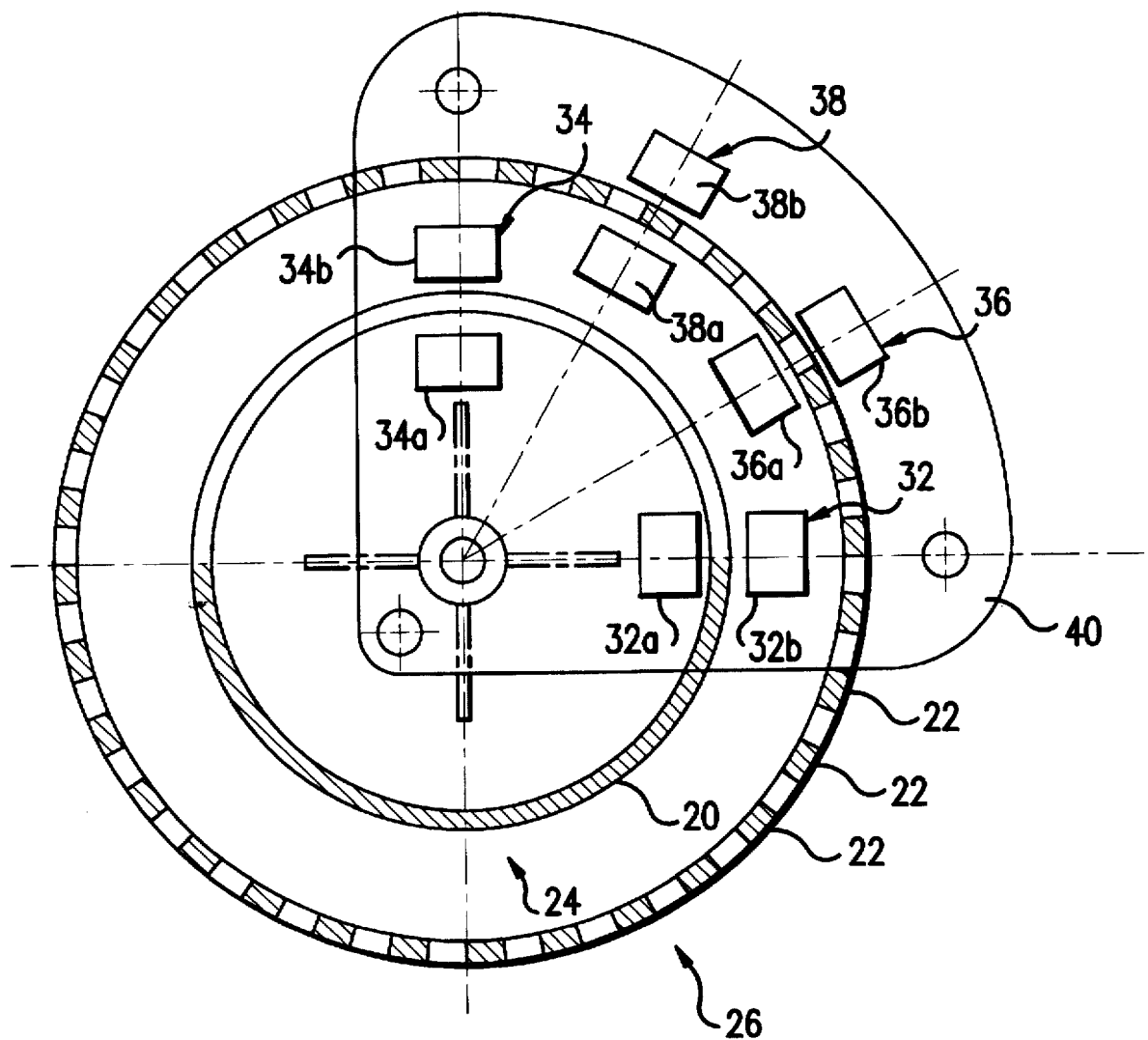
FIG. 4 is a diagrammatic side view of the toothed wheels and the optical sensors of the FIG. 3 apparatus.

As shown in FIG. 4, the first wheel 24 may be constituted by only one tooth (D1=1), for example, occupying half of the corresponding circle of radius $R_1$. The second wheel 26 is constituted, for example, by 32 teeth (D2=32) uniformly distributed around the corresponding circle of radius $R_2$ where $R_2$ is about twice $R_1$ and is equal to the radius of the mechanical part 12.

The part 12 is mounted to rotate on a pivot 28, which pivot is designed to engage in the central hole 14. The pivot is fixed to a stationary support 30, which in the present example is an electronics card.

The apparatus 10 includes at least one optical sensor 32 constituted by an emitter 32a, e.g. an infrared diode, and by a receiver, e.g. a phototransistor. The optical sensor formed in this way constitutes a U-shaped fork with one of its branches constituted by the emitter and the other branch constituted by the receiver. The base of the U-shape of the optical sensor is fixed to the support 30. The emitter and the receiver of the sensor 32 are fixed facing each other on either side of the path of the teeth 20 of the corresponding wheel 24, as can be seen in FIGS. 3 and 4. In the example described, two optical sensors 32 and 34 are associated with the toothed wheel 24 and two optical sensors 36 and 38 are associated with the toothed wheel 26. For each of the toothed wheels, each sensor is disposed relative to the other sensor at an angle equal to half the width of one of the teeth. Thus, for the smaller wheel 24, the two sensors are offset by 90°, and for the larger wheel 26, the sensors are offset by 31°. A plate 40 secured to the electronics card 30 serves to position the various optical sensors relative to one another in the above-specified geometrical disposition. It would also be possible to use non-optical sensors associated with marks other than visible associated with the rotary shaft.

Figure 5:
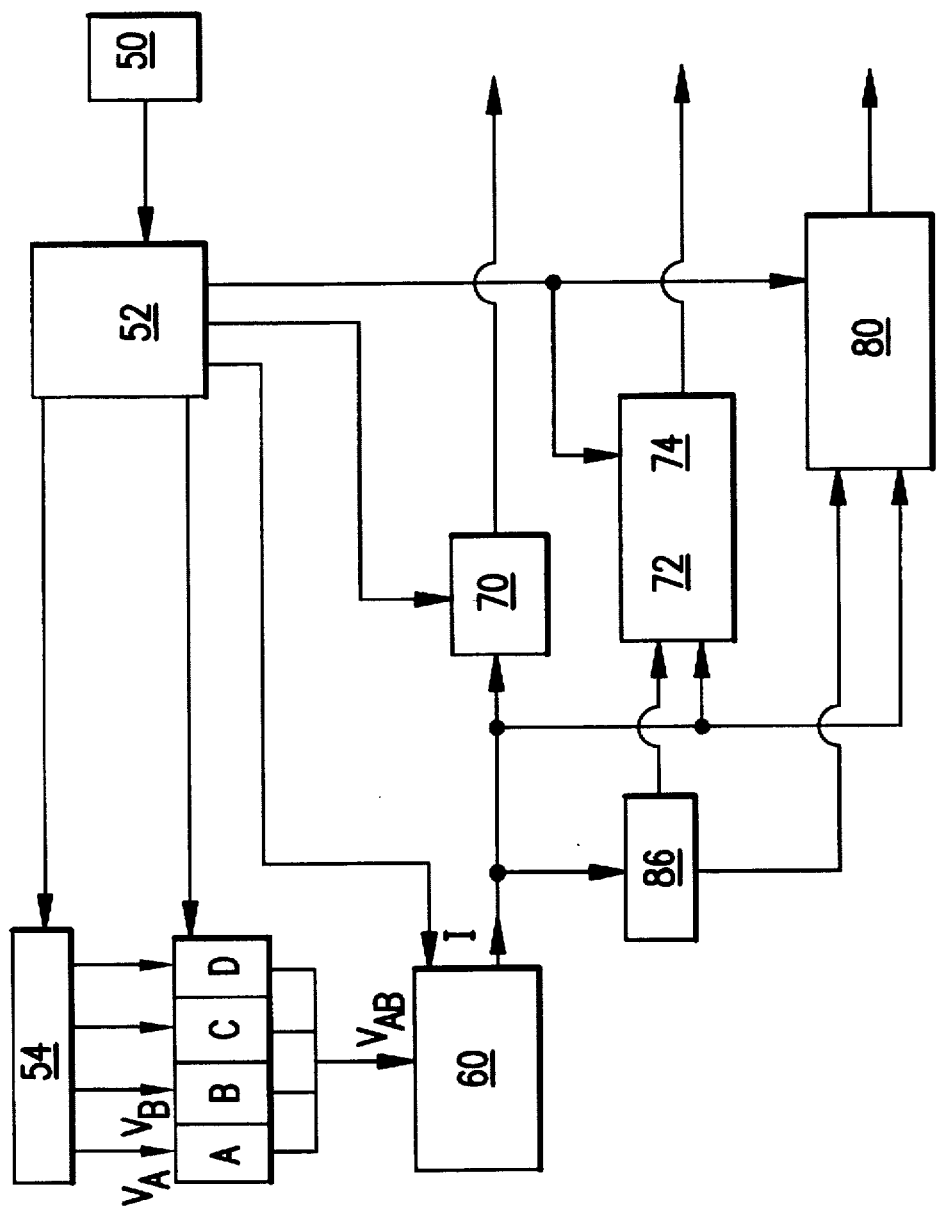
FIG. 5 is a block diagram showing the various electronic functional blocks of the apparatus.

FIG. 5 is an overall view of the main functional blocks of the apparatus 10 for monitoring variation in the current value of a rate of fluid flow of the invention, as required for performing the various steps of the method of the invention. Apart from the optical sensors and the toothed wheels, these blocks form part of an application specific integrated circuit (ASIC) which is installed on the above-mentioned electronics card 30. The integrated circuit controls the sensors and performs electronic processing of the information coming from the sensors. The card also carries a microcontroller that programs certain control parameters of the sensors (sampling frequencies, predetermined flow rate values, . . . ) and that makes use of the signals provided by the integrated circuit, and a battery for powering the various components of the apparatus of the invention, but these are not shown in the figures.

As shown in FIG. 5, a master clock 50 delivers a base frequency, e.g. equal to 32 kHz, and an electronic frequency divider block 52 is responsive to said frequency to deliver electrical signals in the form of pulses at frequencies that vary over time in application of the predetermined sampling relationship to the various functional blocks of the apparatus 10.

As previously described, to determine accurately the flow rate of gas over the range $Q_0$ to $Q_{max}$, a frequency is selected that makes it possible to determine the current flow rate value all the way to $Q'_1=1.25Q_{max}$. By way of example, the frequency $f_1$ is equal to 2.5 times the value taken by the frequency of rotation of the shaft 1 when the current value of the gas flow rate is equal to $Q_{max}$. For example, the frequency $f_2$ is advantageously selected to be equal to the expression $\lfloor Q_2/2Q'_2 \rfloor f_1$, where $\lfloor x \rfloor$ designates the first integer greater than or equal to x. For example, $f_2$ can be selected to be equal to $4f_1$ for $Q_1=6$ m³/h and $Q_2=50$ m³/h. $Q_0$ is selected to be equal to zero, and $f_1$ is equal, for example, to 3.5 Hz while $f_2$ is equal to 14 Hz.

By using pulse signals generated at a plurality of judiciously selected frequencies, it is possible to reduce considerably the electrical power consumed and thus to increase the lifetime of the battery in comparison with a DC power supply signal or in comparison with sampling at a high frequency, while nevertheless monitoring the current value of the gas flow rate, and in particular determining $Q_{max}$ with the desired accuracy and detecting flow at the excess rate.

Figure 6:
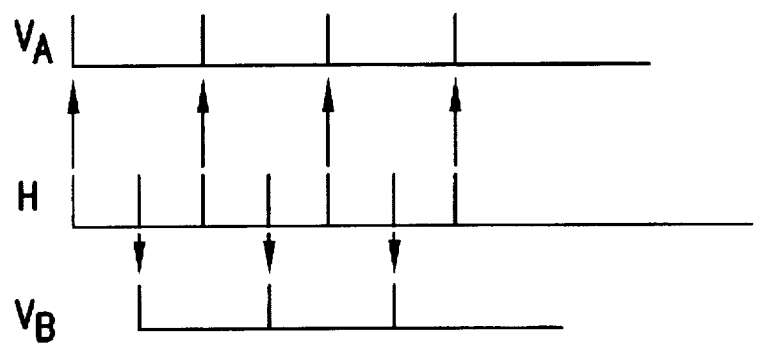
FIG. 6 is a diagram showing how pulse sequences VA and VB are generated for powering the optical sensors A and B.
Figure 7:
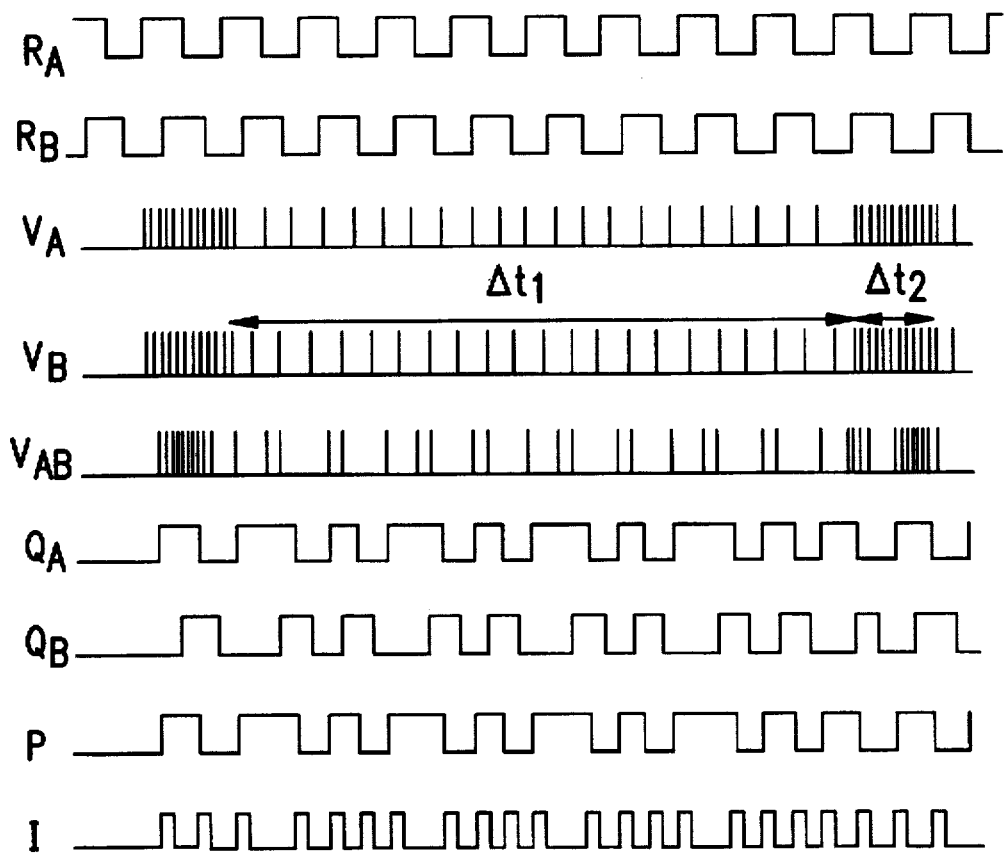
FIG. 7 is a waveform diagram showing the various signals used in apparatus of the invention.

Under normal operating conditions of the gas meter, a switching block 54 serves to select the two optical sensors 32 and 34 marked A and B for the smaller toothed wheel 24 from the four sensors 32, 34, 36, and 38, with the sensors 36 and 38 being marked C and D. The frequency divider block 52 takes the master clock signal 50 and generates in conventional manner a sequence of electrical signals referred to as the clock signal H in the form of successive pulses over time comprising a first series of pulses generated at the frequency $2f_1$ and a second series of pulses generated at the frequency $2f_2$, i.e. $8f_1$. Given that two optical sensors are used per wheel in the example described, the diodes of each sensor A and B are powered alternately in time, which makes it necessary to generate two pulse sequences from the master clock sequence 50. Thus, to power the diode of sensor A, a pulse sequence $V_A$ is generated from the even pulses of the clock sequence H, as shown in FIG. 6, thus obtaining a first series of 20 spaced-apart pulses (frequency $f_1$) followed by a second series of 13 closer-together pulses (frequency $f_2=4f_1$). Similarly, to power the diode of sensor B, a sequence $V_B$ of pulses is generated from the odd pulses of the clock sequence H, thereby obtaining a series of 21 spaced-apart pulses (frequency $f_1$) followed by a second series of 12 closer-together pulses (frequency $f_2$). These two sequences $V_A$ and $V_B$ which are interleaved in time are shown in FIG. 7.

Each series of pulses generated at the frequency $f_1$ lasts for a duration $\Delta t_1$, and each series of pulses generated at the frequency $f_2$ lasts for a duration $\Delta t_2$.

Each optical sensor A and B powered in this way delivers a binary output state depending on the position it occupies relative to the tooth 20 of the wheel 24. Since the optical sensors A and B are offset by 90°, the signals $R_A$ and $R_B$ at the top of FIG. 7 represent the profile of the tooth 20 of the wheel 24 as it would be identified by said sensors if they were powered permanently. The outputs of the optical sensors A and B are connected together as a "wired-OR" at a single input of electronics block 60 that serves to determine whether the movement of the shaft is rotary motion or oscillation and to reconstitute the signal P corresponding to the rotary movement of the shaft as a function of time as picked up by the sensors A and B (FIG. 7). The signal at the input of block 60 is represented by $V_{AB}$ in FIG. 7.

The binary output states from the optical sensors A and B are used to form an output signal which represents the succession over time of bits corresponding to detection and non-detection of a rotary movement of the shaft, as picked up said optical sensors. Initially, the signals $V_A$ and $V_B$ are demultiplexed by sampling the signal $V_{AB}$ in two bistables $Q_A$ and $Q_B$, on the falling edges of the respective pulses of the sequences $V_A$ and $V_B$ powering the optical sensors A and B. The outputs from the bistables $Q_A$ and $Q_B$ are shown in FIG. 7. Thereafter, a circuit 62 forming part of the electronics block 60 and constituted by inverters, NAND gates, and an R/S bistable serves to distinguish between oscillation and rotation of the shaft by identifying and selecting the successive binary input states from the sensors A and B.

The output of the R/S bistable is thus forced:
via its "Set" input by the value of the logic product "$Q_A$ AND $\overline{Q_B}$"; and
via its "Reset" input by the value of the logic product "$Q_B$ AND $\overline{Q_A}$".

The circuit 62 serves to detect rotation which corresponds to the following successive states: $Q_A=0$, $Q_B=1$, $Q_A=1$, $Q_B=0$, $Q_A=0$.

Advantageously, by having at least two optical sensors per wheel, it is possible to refine the information acquired about the movement of the shaft.

In this configuration, one of the sensors, e.g. sensor A, serves to detect rotary movement of the shaft while the sensor B serves to verify that it does indeed constitute rotation and not oscillation. At the output from the circuit 62, a reconstituted signal P is obtained corresponding to the rotary movement of the shaft over time as picked up by the optical sensors A and B. This signal P shown at the bottom of FIG. 7 is constituted by a succession of logic 0 and 1 states accompanied by rising and falling edges which correspond to 0 to 1 or to 1 to 0 transitions. Each of these transitions represents a rotary movement of the shaft being detected, with each movement corresponding given to a given volume of gas.

Figure 8:
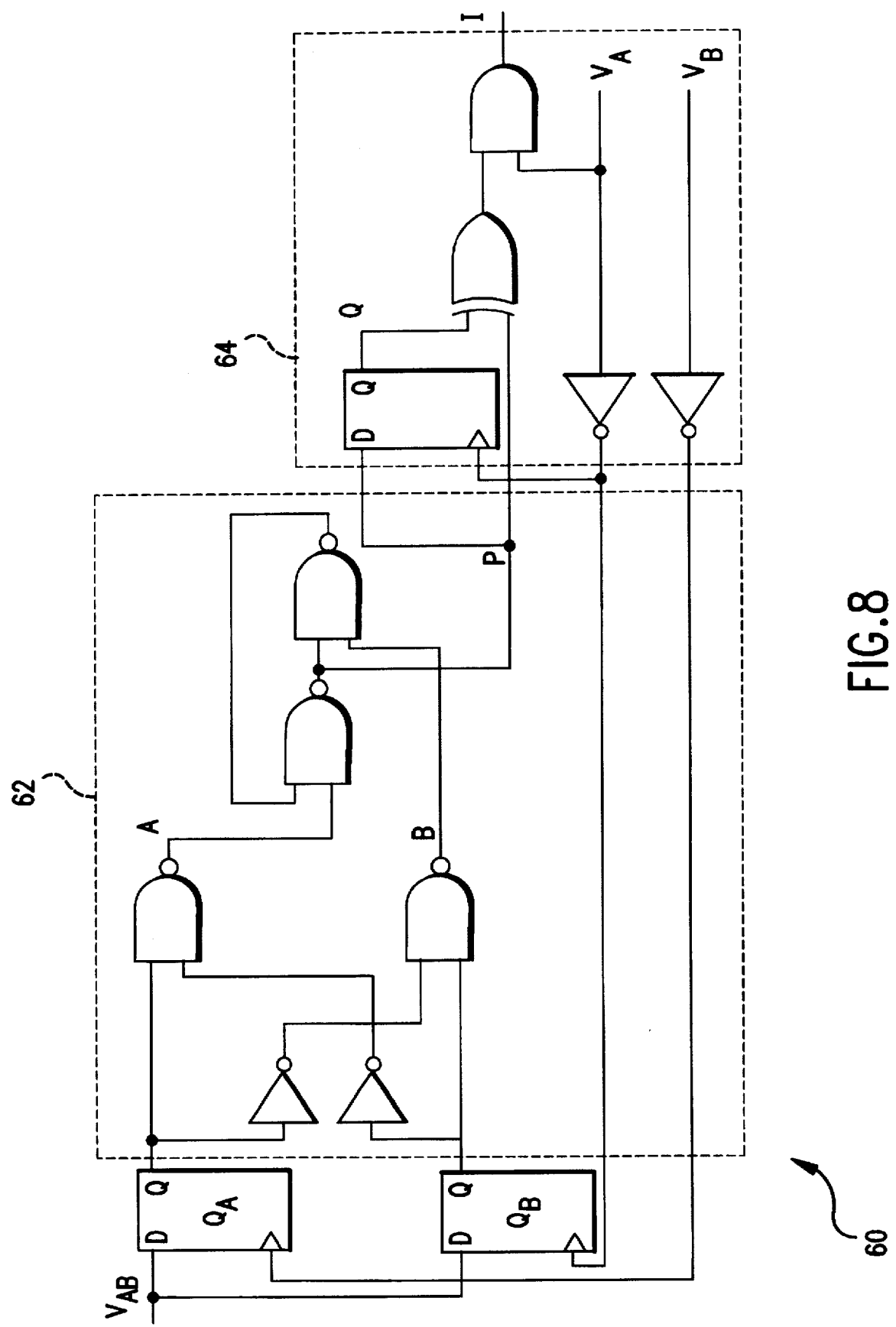
FIG. 8 is a detailed view of the electronics block 60 in the apparatus of the invention.

Bits corresponding to detection or non-detection of a rotary movement of the shaft is extracted from the reconstituted signal P so as to produce an output signal I (FIG. 7) which directly represents the appearance over time of detection and non-detection bits in the form of detection pluses as picked up by the sensors A and B. This signal is produced from the reconstituted signal P by means of a circuit 64 in block 60 (FIG. 8), which circuit is constituted by a D-type bistable, an exclusive OR gate (XOR), and a NAND gate. It should be specified that this step of transforming the reconstituted signal P into a signal I is not essential, and said signal P could be processed electronically directly, in which case the signal P would be the output signal during electronic processing in the remainder of the method of the invention.

In a variant of the invention, it is possible to use only one optical sensor per wheel. Under such circumstances, only a single power supply sequence is generated for the optical sensor, which sequence is constituted by a series of pulses generated at the frequency $f_1$ during a time interval $\Delta t_1$ and a series of pulses generated at the frequency $f_2$ during a time interval $\Delta t_2$.

A block 70 for counting detection pulses coming from the signal I serves to count only those pulses that have a logic value equal to 1, and this provides continuous measurement of the volume of gas that has passed through the measurement unit of the meter. By way of example, the block 70 can be constituted by a four-bit electronic counter. Electronic processing is then performed on the bits corresponding to detection or non-detection of a rotary movement of the shaft at each sampling frequency $f_1$ and $f_2$ in order to determine the current value of the fluid flow rate over a continuum of flow rates extending from $Q_0$ to $Q_2$ (50 m³/h) with the current value being determined relative to the predetermined values $Q_1$ and $Q_2$.

More precisely, the method of the invention serves to determine the current value of the flow rate relative to the flow rate ranges $Q_0$ to $Q'_1$ and $Q'_2$ to $Q_2$, thus making it possible to determine whether the gas meter is in metering mode over its flow rate measuring range (0 to $Q_{max}$) or whether it is running at an excess rate in the range c ($Q'_2$ to $Q_2$).

The first processing step consists in selecting a predefined number of detection and non-detection bits in the output signal I, which number is chosen differently for each of the frequencies $f_1$ and $f_2$. Under normal operating conditions of the gas meter in which the sensors A and B are powered at the sampling frequency $f_1$, a predefined number of bits is selected by storing them in an $I_1$-bit shift register 72 at said sampling frequency $f_1$, with this continuing throughout the duration of normal operating conditions. Each of the bits is stored at the frequency $f_1$ in the form of a "1" bit or a "0" bit depending on whether it represents detection or non-detection.

In order to determine the current value of the gas flow rate, the $I_1$ bits are summed by an electronics block which is constituted by an array of half-adders 74 as each of said bits is selected and stored in the register. Nevertheless, to obtain a better accuracy, it is necessary to apply a weighting coefficient to each of the $I_1$ bits. The example described below shows more clearly why it is advantageous to weight the bits in the register 72. Assume that a first detection bit ("1") is stored in the register and benefits from very good time accuracy, i.e. the transition (detection) was detected at almost exactly the same moment as when it physically occurred. Thereafter, other bits ("0" or "1") are stored in the register, but these bits have very poor time accuracy, and they are followed by a last bit that benefits from very good time accuracy which is registered in the first bit position of the said shift register 72. Under those specific circumstances, the first registered bit is in the last bit position of the register and between the two end bits an accurate time interval is therefore available given the accurate bits acquired concerning gas volume, so it is possible to obtain an averaged flow rate value that is correct. At this point, the next bit registered in the shift register, e.g. a bit having poor time accuracy, causes the first registered bit to leave the last bit position of the register 72, thereby imparting poor accuracy to the entire register which can lead to a degraded averaged flow rate value. Consequently, by applying weighting coefficients to the bit positions of the register in application of a special relationship, it is possible to minimize the effects of bits entering and leaving the register.

Preferably, an identical and maximum weighting coefficient is given to central bits while respectively increasing and decreasing coefficients are given to the bits which correspond to the last and first bits entered into the register. For example, $I_1$ is equal to 20, $f_1=3.5$ Hz, and thus $I_1/f_1$ is equal to 5.7 s. Each bit corresponding to a transition represents a flow rate of $Q_{max}/16$, i.e. 0.6 l/h. The weighting relationship as a function of bit position in the register is as follows:

for the first four positions, the value of the weight increases linearly from 1 to 4;

for the twelve middle positions, the weight is constant and equal to 5; and for the last four positions, the value of the weight decreases linearly from 4 to 1.

The electronics block 74 can also apply weighting in conventional manner.

While the bits are being registered and weighted, the electronics block 74 does not sum said weighted bits. The value $Q_{max}$ is detected by recognizing a sum of value greater than 64 which corresponds to the presence of 16 detection bits or transitions in the register 72. When this is detected, an alarm signal is triggered telling the microprocessor that an order must immediately be generated for closing the valve situated upstream from the meter.

When the sum is equal to 80, that means that the current value of the flow rate is equal to $1.25Q_{max}$ ($Q'_2$). After time has elapsed that corresponds to storing 16 detections, a flow rate value averaged over time is obtained that has very good accuracy, e.g. 1.8%. In general, the accuracy with which the averaged flow rate value is obtained depends on the number of bits $I_1$ and on the frequency $f_1$. The time $I_1/f_1$ should make it possible to obtain the desired accuracy and to smooth the phenomenon of irregularity in the rotary motion of the shaft.

Electronic processing of the bits at the sampling frequency $f_1$ is performed continuously over time during normal operating conditions so as to be able to determine at any instant the current value of the fluid flow rate over the measuring range of the meter. At the end of a time interval equal to $\Delta t_1$, the bits corresponding to detection and to non-detection of a rotary movement of the shaft are electronically processed at the sampling frequency $f_2$ over a time interval $\Delta t_2$, i.e. while simultaneously powering the sensors A and B at said sampling frequency. For example, $\Delta t_1=6$ s and $\Delta t_2=0.9$ s.

The block 80 serves to select a predefined number $I_2$ of bits and to identify amongst said $I_2$ bits the number of detections (transitions) that are present. The number $I_2$ depends on the frequency $f_2$ and on the predetermined value $Q_1$ of flow rate and also on the number of teeth D1. If the number of detections is greater than a predetermined number $I_3$ which depends on $Q_1$ and on the number of teeth D1 of the toothed wheel, then it is known that the current value of the fluid flow rate lies in the flow rate range c, i.e. between the predetermined values $Q'_2$ and $Q_2$.

To detect a value greater than the predetermined value $Q'_2=1.25Q_{max}$ using the one-tooth wheel 24 at the frequency $4f_1$, it suffices to know how many times the optical sensors A and B detect true rotations over one complete revolution which is performed in seven periods at said frequency $4f_1$. This means that the detection threshold consists in knowing whether the optical sensors A and B detect more than three transitions out of a number of bits equal to 8, i.e. in seven consecutive periods. Consequently, in this example $I_2=8$ and $I_3=3$. Nevertheless, these predetermined numbers may vary depending on the predetermined flow rate values and on the selected sampling frequencies.

Figure 9:
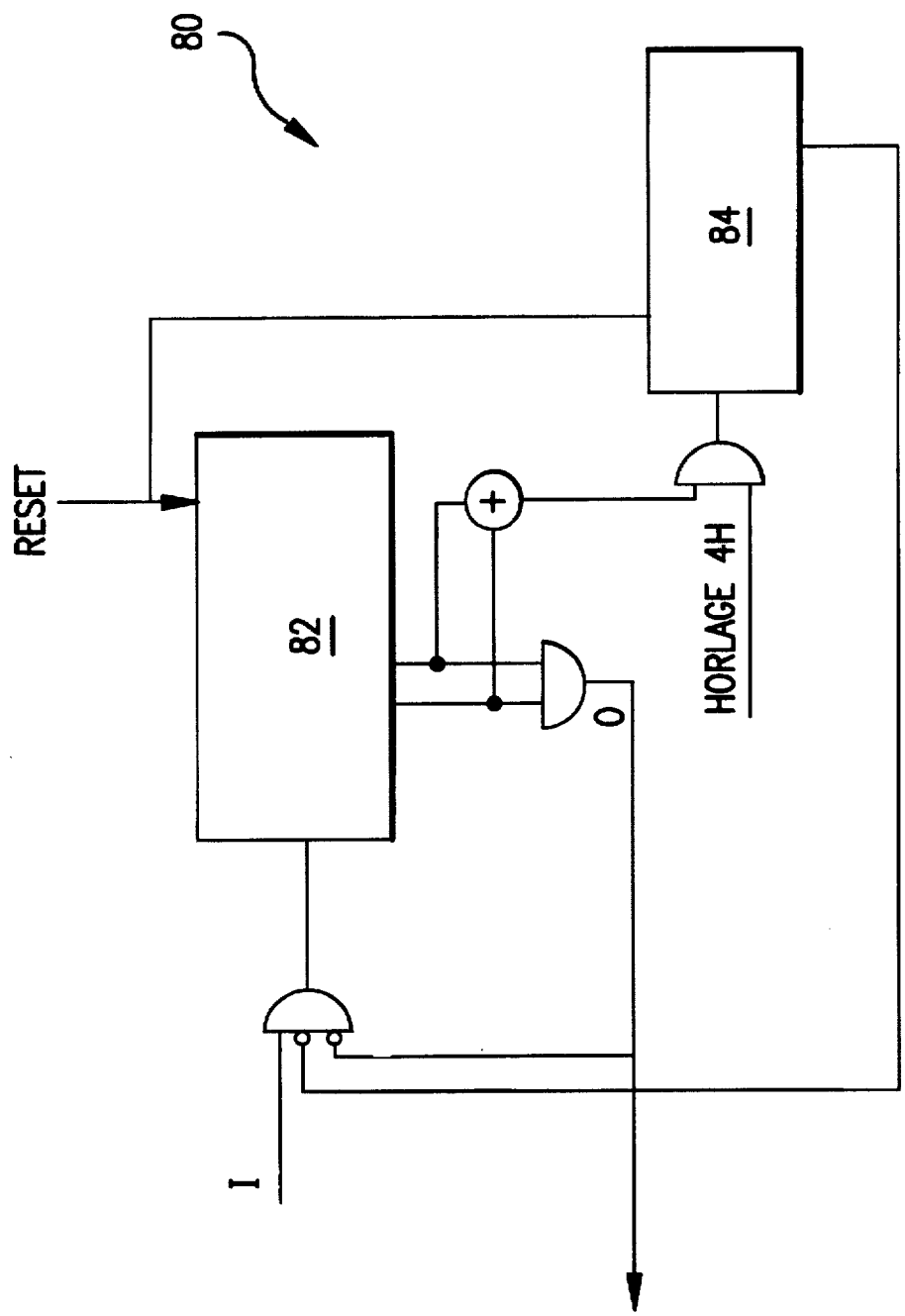
FIG. 9 is a detailed view of the electronics block 80 of the apparatus of the invention.

As shown in FIG. 9, a logic AND gate having inverting inputs is located at the input to block 80 together with a 2-bit counter 82 which identifies the predetermined number $I_3$ of transitions and a counter 84 that selects a predefined number $I_2$ of consecutive samples, i.e. a number for seven periods of the clock $4f_1$. The very simple electronic circuit also includes two AND gates. This block 80 thus operates by registering transitions in the 2-bit counter 82 until seven successive periods of the clock $4f_1$ have elapsed. As soon as the counter detects three transitions, the registering of new transitions is stopped and a signal is generated indicative of an excess rate being detected, thus enabling the valve upstream from the meter to be closed.

The apparatus 10 for monitoring variation in the current value of the fluid flow rate can also detect gas leaks because of the good resolution obtained with the second tooth wheel 26. This wheel can detect a rotation of 5.6°, i.e. a volume of gas equal to 0.018 liters.

When the gas meter is placed under leakage detection conditions, after the upstream valve has been opened, the idea is to detect a leakage rate of about 5 l/h over a period of time that may be equal to 50 s, for example. The switch block 54 selects the sensors C and D of the second tooth wheel and the divider block feeds each of them in time alternation with a series of electrical signals in the form of pulses at a frequency $f_3$ greater than the product of the number of teeth D2 multiplied by the frequency $f_2$, i.e. thirty-two times the sampling frequency $f_2=1.4$ Hz, which number may be equal to 512 Hz, for example. This frequency $f_3$ is selected as a function of the number of teeth D2 of the wheel 26 and as a function of the frequency $f_2$.

In a manner analogous to that described above, the sensors C and D deliver output bits which are stored and used by the D-type and R/S bistables of the block 60 to form the output signal I representing the appearance in time of detection bits and of non-detection bits in the form of pulses as picked up by the sensors C and D. The 4-bit counter 70 then counts the number of pulses that corresponds to detection of shaft movement during the above-mentioned period of time (50 s), and sends the count result to the microcontroller, and as soon as a given number of pulses has been registered, a valve closure signal is triggered by the microcontroller. This number means that a predetermined value $Q_3$ of fluid flow rate has been reached, which rate is known as the leakage rate, where $Q_3<Q_1$, e.g. $Q_3=5$ l/h.

In a variant of the invention, the microcontroller reads directly the bits corresponding to detection of a rotary movement of the shaft from the outputs of the bistables $Q_A$ and $Q_B$ of the block 60. Simultaneously, with the operation of counting the shaft rotary movement detection bits in the output signal I, a frequency divider block 86 divides the frequency of said signal by 32 which corresponds to the number of teeth 22 of the larger wheel 26 so as to enable the same functional blocks 72, 74, and 80 to be reused. Throughout the time that leakage detection conditions last, the information provided by the output signal is electronically processed simultaneously at the respective sampling frequencies $f_1$ and $f_2$ in a manner that is identical to that described above when describing the functional blocks 72, 74, and 80. The result of this simultaneous process advantageously makes it possible to monitor variation in flow rate over flow rate ranges that include the predetermined values $Q_1$ and $Q_2$ during leakage detection conditions.

Advantageously, because of the variable nature of the sampling frequency, it is possible to adapt the previously used sampling frequency values $f_1$, $f_2$, $f_3$ to any unit volume of fluid characteristic of a measurement unit for a given fluid meter, thereby making it possible to calibrate said meter without it being necessary to perform any subsequent correction on the sampled flow rate.

We claim:

1. A method of monitoring variation in the current value of a rate of fluid flow through a fluid meter which includes a measurement unit and a rotary shaft connected to said measurement unit and suitable for rotating about its own axis when a volume of fluid passes through the measurement unit, the method consisting in detecting rotary movements rather than rotation of the shaft at a sampling frequency that is variable between two frequencies in application of a predetermined sampling relationship according to corresponding predetermined fluid flow rate values, and in electronically processing bits corresponding to detection and to non-detection of a rotary movement of the shaft at said sampling frequencies in order to determine the current value of the fluid flow rate over a continuum of flow rates and relative to the predetermined fluid flow rate values included in said continuum of flow rates.

2. A method according to claim 1, wherein rotary movements rather than rotation of the shaft are detected at at least two sampling frequency values $f_1$ and $f_2$ predetermined by the sampling relationship in such a manner that $f_1$ is defined as a function of a first predetermined fluid flow rate value $Q_1$, and $f_2$ is defined as a function of $Q_1$ and of a second predetermined fluid flow rate value $Q_2$, where $f_1 < f_2$ and $Q_1 < Q_2$, with the frequencies $f_1$ and $f_2$ thus defining two ranges of flow rates of the continuum, which ranges overlap partially, one extending up to a flow rate value $Q'_1$ defined by the frequency $f_1$, where $Q_1 < Q'_1 < Q_2$, and the other extending from a flow rate value $Q'_2$ defined by said frequency $f_1$ and up to a value $Q_2$, where $Q_1 < Q'_2 < Q'_1$, and the bits are processed electronically as a function of said frequencies $f_1$ and $f_2$ in order to determine the current value of the fluid flow rate relative to said ranges of flow rates.

3. A method according to claim 2, wherein, prior to processing the bits electronically, said method consists in performing the following steps:

1) a plurality of consecutive electrical signals are generated at the sampling frequency which is variable in application of the predetermined sampling relationship;

2) at least one sensor is powered with each of said electrical signals, said sensor being placed facing the path of at least one mark associated with the rotary shaft and being designed to deliver a binary output state depending on the position of said sensor relative to said mark; and 3) said binary output states are used to form an output signal representative of the succession in time of bits corresponding to detection and to non-detection of a rotary movement of the shaft, each detection representing a given volume of fluid.

4. A method according to claim 3, wherein, during step 1):

a) during a first time interval $\Delta t1$, at least one electrical signal is generated at the frequency f1;

b) during a second time interval $\Delta t2$ consecutive to $\Delta t1$, at least one electrical signal is generated at the frequency f2; and c) the above steps are repeated.

5. A method according to claim 4, wherein:

a) the bits representing detection and non-detection of rotary movement of the shaft coming from the output signal are continuously processed electronically at the sampling frequency f1;

b) at the end of a time interval $\Delta t1$ during which the bits are electronically processed at said frequency f1, the bits representing detection and non-detection of rotary movement of the shaft coming from said output signal are simultaneously processed electronically at the sampling frequency f2; and c) the above two steps are repeated.

6. A method according to claim 2, wherein the frequency f2 depends on the frequency f1.

7. A method according to claim 2, wherein the frequency f2 is greater than or equal to $\delta Q2/2Q'2\rho f1$ where $\delta x \rho$ represents the first integer greater than or equal to x.

8. A method according to claim 2, wherein the sampling frequency f1 is greater than twice the value of the rotary frequency of the shaft which is obtained when the current value of the fluid flow rate is equal to Q1.

9. A method according to claim 3, wherein a plurality of marks are associated with the rotary shaft.

10. A method according to claim 4, wherein a plurality of marks are associated with the rotary shaft and wherein, instead of generating a plurality of consecutive signals at respective frequencies f1 and f2, a plurality of consecutive signals are continuously generated at a sampling frequency f3 greater than the frequency f2 and selected as a function of a predetermined fluid flow rate value Q3, where Q3 < Q1, as a function of f2, and as a function of the number of marks, and the number of detections of rotary movement of the shaft is counted in order to determine the current fluid flow rate value relative to the predetermined values Q1 and Q3.

11. A method according to claim 10, wherein simultaneously the bits of the output signal are continuously electronically processed at the sampling frequencies f1 and f2 to determine the current value of the fluid flow rate relative to the predetermined values $Q_1$ and $Q_2$, and more particularly relative to the two flow rate ranges.

12. A method according to claim 10, wherein the frequency $f_3$ is greater than the product of the number of marks multiplied by the frequency $f_2$.

13. A method according to claim 5, wherein, during electronic processing of the bits at the sampling frequency $f_1$, a number $I_1$ of bits are selected by being stored at the sampling frequency $f_1$ over a time interval $I_1/f_1$, the $I_1$ bits are summed as they are stored in order to determine the current fluid flow rate value up to the predetermined value $Q'_2$ with accuracy that depends on $I_1$ and $f_1$.

14. A method according to claim 13, wherein, prior to summing the $I_1$ bits, each of them is given a weighting coefficient so as to improve accuracy in determining the current fluid flow rate value.

15. A method according to claim 14, wherein the $I_1$ bits are stored in a shift register having $I_1$ bit positions, and an identical and maximum weighting coefficient is given to each of the central bit positions while respectively increasing and decreasing coefficients are given to the bit positions corresponding to the last and first bits stored.

16. A method according to claim 5, wherein, during electronic processing of the bits at the sampling frequency $f_2$, a predefined number $I_2$ of output signal bits are selected and the number of bits in said $I_2$ bits and representing detections of shaft movement is identified, and if the identified number is not less than a predetermined number $I_3$, then the current fluid flow rate value lies between the predetermined fluid flow rate values $Q'_2$ and $Q_2$, otherwise said current value is less than $Q'_2$.

17. A method according to claim 16, wherein the predefined number $I_2$ of bits depends on $f_2$, $Q_1$, and on the number of marks.

18. A method according to claim 16, wherein the number $I_3$ depends on $Q_1$, and on the number of marks.

19. A method according to claim 1, wherein it is determined whether the movement of the shaft is a rotary movement or an oscillatory movement by powering another sensor in alternation and by identifying and selecting the successive binary output states of the sensors.

20. A method according to claim 2, wherein the sensor is an optical sensor.

21. A fluid meter comprising a measurement unit for measuring a volume of fluid, which unit is connected to a rotary shaft for which each revolution represents a volume of fluid passing through said measurement unit, and apparatus for monitoring variation in the current value of the fluid flow rate on the basis of rotation of said shaft wherein said apparatus comprises:

at least one sensor placed facing the path of at least one mark associated with the rotary shaft and designed to deliver an output bit depending on the position of said sensor relative to said mark;

means for generating consecutive electrical signals at a sampling frequency that is variable between two frequencies in application of a predetermined sampling relationship to power said optical sensor, each frequency value being defined as a function of at least one predetermined fluid flow rate value;

means for forming an output signal on the basis of the binary output states delivered by the sensor, said output signal representing the succession in time of bits corresponding to detection and non-detection of a rotary movement of the shaft; and electronic bit processing means for processing said bits depending on said sampling frequency in order to determine the current value of the fluid flow rate over a continuum of flow rates and relative to the predetermined fluid flow rate value on which the value of the sampling frequency depends.

22. A fluid meter according to claim 21, wherein the electronic bit processing means, comprise, in particular, means for selecting a predefined number of bits of the output signal which number is different for each value taken by the sampling frequency.

23. A fluid meter according to claim 22, wherein the electronic bit processing means comprise means for selecting a predefined number $I_1$ of output signal bits at a value $f_1$ of the sampling frequency selected as a function of a predetermined fluid flow rate value $Q_1$, said means being storage means, together with summing means for summing the stored $I_1$ bits to determine the current value of the fluid flow rate over a range of flow rates of the continuum extending up to a value greater than $Q_1$ and defined by the value selected for $f_1$, with said determination having accuracy that depends on $I_1$ and $f_1$.

24. A fluid meter according to claim 23, wherein the bit storage means comprise at least one shift register constituted by $I_1$ bit positions each designed to receive one bit at the sampling frequency $f_1$.

25. A fluid meter according to claim 24, wherein the electronic processing means also comprise weighting means for weighting the $I_1$ bits in application of a relationship that applies an identical and maximum weighting coefficient to each of the central bit positions and respectively increasing and decreasing weighting coefficients for the bit positions corresponding to the last and first stored bits, said weighting relationship serving to improve the accuracy with which the current flow rate value is determined.

26. A fluid meter according to claim 23, wherein the electronic bit processing means comprise means for selecting a predefined number $I_2$ of bits of the output signal at a value $f_2$ for the sampling frequency, $f_2$ depending on $f_1$, on $Q_1$, and on a second predetermined fluid flow rate value $Q_2$, where $f_1 < f_2$ and $Q_1 < Q_2$, $I_2$ depending on $f_2$, on $Q_1$, and on the number of marks, and also means for identifying amongst said $I_2$ bits the number of bits representing detection of shaft movement, said number serving to determine whether the current fluid flow rate value lies in the range of flow rates going up to the value greater than $Q_1$, or in a range that extends from said value up to $Q_2$.

27. A fluid meter according to claim 21, wherein the sensor is an optical sensor and the marks are visible marks.

28. A fluid meter according to claim 27, wherein the apparatus for monitoring variation in the current value of a fluid flow rate includes a wheel constrained to rotate with rotation of the shaft and provided with a number of teeth or visible marks equal to D1.

29. A fluid meter according to claim 28, wherein the apparatus for monitoring variation in the current value of the fluid flow rate includes another wheel constrained to rotate with the shaft and provided with a number of teeth or visible marks equal to D2, where D2>D1.

30. A fluid meter according to claim 21, wherein the apparatus for monitoring variation in the current value of the fluid flow rate include means for determining whether the movement of the shaft is a rotary movement or an oscillatory movement.

31. A fluid meter according to claim 30, wherein the means for determining whether the movement of the shaft is a rotary movement or an oscillatory movement comprise a second optical sensor for each wheel and disposed relative to the first optical sensor at an angle equal to half the width to one of the teeth, together with electronic processing means for identifying and selecting the successive output states of the optical sensors.

32. A fluid meter according to claim 28, wherein each optical sensor is constituted by an emitter and a receiver placed facing each other on either side of the path of teeth of the wheel.

* * * * *